United States Patent
Willis et al.

(10) Patent No.: US 12,248,352 B2
(45) Date of Patent: Mar. 11, 2025

(54) COMPUTER ORCHESTRATION

(71) Applicant: BRITISH TELECOMMUNICATIONS PUBLIC LIMITED COMPANY, London (GB)

(72) Inventors: Peter Willis, London (GB); Andrew Reid, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 52 days.

(21) Appl. No.: 18/255,064

(22) PCT Filed: Nov. 12, 2021

(86) PCT No.: PCT/EP2021/081594
§ 371 (c)(1),
(2) Date: May 30, 2023

(87) PCT Pub. No.: WO2022/117320
PCT Pub. Date: Jun. 9, 2022

(65) Prior Publication Data
US 2024/0019923 A1   Jan. 18, 2024

(30) Foreign Application Priority Data
Dec. 2, 2020   (GB) .................................. 2018987

(51) Int. Cl.
*G06F 1/32* (2019.01)
*G06F 1/3206* (2019.01)
(Continued)

(52) U.S. Cl.
CPC ............ *G06F 1/324* (2013.01); *G06F 1/3206* (2013.01); *G06F 9/45558* (2013.01);
(Continued)

(58) Field of Classification Search
CPC .... G06F 1/324; G06F 1/3206; G06F 9/45558; G06F 2009/45595; G06F 1/3234;
(Continued)

(56) References Cited

U.S. PATENT DOCUMENTS 9,575,536 B2 *  2/2017  Rajappa .................. G06F 1/329
9,696,786 B2 *  7/2017  Panda .................... G06F 1/3234
(Continued)

FOREIGN PATENT DOCUMENTS

CN        106569575 A       4/2017

OTHER PUBLICATIONS

Combined Search and Examination Report for GB2018987.4, dated Aug. 27, 2021, 11 pages.
(Continued)

*Primary Examiner* — Volvick Derose
(74) *Attorney, Agent, or Firm* — Nixon & Vanderhye P.C.

(57) ABSTRACT

A computer system comprising a plurality of computers, each computer comprising at least one processor, respectively, such that the computer system comprises a plurality of processors, and an orchestration system comprising an orchestrator. The orchestration system is configured to: forecast a traffic load of the plurality of processors to obtain a forecast traffic load: determine, in dependence on the forecast traffic load, a clock frequency for each of the plurality of processors so as to decrease a power consumption of the computer system; and using the orchestrator, instruct adjustment of the clock frequency for each respective processor of the plurality of processors to the clock frequency determined for the respective processor. This patent application further relates to a telecommunications network comprising a computer system, and an orchestration system.

21 Claims, 7 Drawing Sheets

(51) Int. Cl.
  *G06F 1/324* (2019.01)
  *G06F 9/455* (2018.01)
  *H04L 41/40* (2022.01)
  *H04L 67/10* (2022.01)
  *G06F 1/3203* (2019.01)

(52) U.S. Cl.
  CPC .............. *H04L 41/40* (2022.05); *H04L 67/10* (2013.01); *G06F 1/3203* (2013.01); *G06F 2009/45595* (2013.01)

(58) Field of Classification Search
  CPC ....... G06F 1/3243; G06F 1/329; H04L 41/40; H04L 67/10; Y02D 10/00
  USPC .......................................................... 713/322
  See application file for complete search history.

(56) References Cited

U.S. PATENT DOCUMENTS

| | | | | |
|---|---|---|---|---|
| 10,289,184 | B2* | 5/2019 | Malik | G06F 1/3209 |
| 2016/0057075 | A1* | 2/2016 | Parikh | H04L 47/76 709/226 |
| 2017/0005515 | A1* | 1/2017 | Sanders | H02J 3/388 |
| 2017/0230267 | A1* | 8/2017 | Armolavicius | H04L 43/062 |
| 2018/0026906 | A1 | 1/2018 | Balle et al. | |
| 2018/0027060 | A1* | 1/2018 | Metsch | G06F 9/544 |
| 2018/0359029 | A1* | 12/2018 | Shiner | H04J 14/0221 |
| 2019/0272002 | A1* | 9/2019 | Seenappa | G06F 1/324 |
| 2020/0106714 | A1* | 4/2020 | Cote | H04L 47/83 |
| 2020/0159281 | A1 | 5/2020 | Seenappa et al. | |
| 2020/0167258 | A1* | 5/2020 | Chattopadhyay | G06F 9/5088 |
| 2020/0195528 | A1* | 6/2020 | Barton | H04L 47/2425 |
| 2020/0310394 | A1* | 10/2020 | Wouhaybi | H04L 67/1051 |
| 2021/0176189 | A1* | 6/2021 | Rabipour | G06F 9/505 |
| 2022/0066499 | A1* | 3/2022 | Trim | H04W 12/69 |
| 2022/0124009 | A1* | 4/2022 | Metsch | H04L 41/5009 |
| 2024/0019923 | A1* | 1/2024 | Willis | G06F 1/324 |
| 2024/0276399 | A1* | 8/2024 | Vasudevan | H04W 24/02 |

OTHER PUBLICATIONS

Ewa Niewiadomska-Szynkiewicz et al., "Resource Management System for HPC Computing", Mar. 2018, ResearchGate, 11 pages, at URL: https://www.resarchgate.net/publication/323611448.

International Search Report and Written Opinion of the ISA for PCT/EP2021/081594 mailed Jan. 31, 2022, 18 pages.

Viresh Kumar, "CPU frequency governors and remote callbacks", Sep. 4, 2017, LWN.net, 3 pages, at URL: https://lwn.net/Articles/732740/.

International Preliminary Report on Patentability dated Jun. 15, 2023, issued for International Application No. PCT/EP2021/081594 (10 pages).

* cited by examiner

COMPUTER ORCHESTRATION

CROSS-REFERENCE TO RELATED APPLICATIONS

This application is the U.S. national phase of International Application No. PCT/EP2021/081594 filed Nov. 12, 2021, which designated the U.S. and claims priority to GB 2018987.4 filed Dec. 2, 2020, the entire contents of each of which are hereby incorporated by reference.

TECHNICAL FIELD

The present invention relates to orchestration within a computer system.

BACKGROUND

The central processing unit (CPU) of a computer is responsible for a significant proportion of power usage of the computer. Reducing the frequency of a CPU clock affords power savings, albeit with a reduction in performance of the CPU. However, the reduced performance of the CPU can be tolerated in certain circumstances. If the frequency of the CPU clock is to be adjusted, the adjustment is typically performed by the CPU itself or by the Operating System (OS) of the computer, based on the load of the CPU. However, this can cause unpredictable performance and generate latency and jitter. It is desirable to alleviate at least some of the aforementioned problems.

SUMMARY

According to a first aspect of the present disclosure, there is provided a computer system comprising: a plurality of computers, each computer comprising at least one processor, respectively, such that the computer system comprises a plurality of processors; and an orchestration system comprising an orchestrator, the orchestration system configured to: forecast a traffic load of the plurality of processors to obtain a forecast traffic load; determine, in dependence on the forecast traffic load, a clock frequency for each of the plurality of processors so as to decrease a power consumption of the computer system; and using the orchestrator, instruct adjustment of the clock frequency for each respective processor of the plurality of processors to the clock frequency determined for the respective processor.

In some examples, the orchestration system is configured to determine the clock frequency for each of the plurality of processors in further dependence on a workflow to be performed by the plurality of processors. The orchestrator may be configured to generate the workflow. The workflow may indicate that performance of a second task by a second processor of the plurality of processors depends on a performance of at least part of a first task by a first processor of the plurality of processors. The orchestration system may be configured to determine to increase the clock frequency of the first processor in response to determining that the workflow indicates that the performance of the second task by the second processor depends on the performance of at least part of the first task by the first processor.

In some examples, the orchestration system is configured to determine the clock frequency for each of the plurality of processors in further dependence on a topology of the computer system. In some examples, the clock frequency for each of the plurality of processors comprises a second clock frequency for a processor of the plurality of processors; the orchestration system comprises a frequency determination component for determining, in dependence on the forecast traffic load, a first clock frequency for the processor so as to decrease the power consumption of the computer system; and the orchestrator is configured to: determine the second clock frequency for the processor, in dependence on the first clock frequency and characteristic data indicative of at least one of: a characteristic of a service to be provided or a characteristic of the computer system; and instruct the adjustment of the clock frequency for the processor to the second clock frequency.

In some examples, the orchestration system is configured to determine, in dependence on the forecast traffic load, that a clock frequency of a processor of the plurality of processors is to be increased so as to decrease the power consumption of the computer system. The orchestration system may be configured to determine that the clock frequency of the processor is to be increased relative to a further processor of the plurality of processors such that a rate of performance of a task by the processor is greater than a rate of performance of a further task by the further processor.

In some examples, the orchestration system is configured to orchestrate the implementation of at least one virtual network function (VNF) using at least one of the plurality of processors. Determining the clock frequency for each of the plurality of processors may comprise determining a first clock frequency for a first processor of the plurality of processors to implement a first VNF of the at least one VNF and a second clock frequency, different from the first clock frequency, for a second processor of the plurality of processors to implement a second VNF of the at least one VNF. The orchestration system may be configured to determine, in dependence on the forecast traffic load, a count of virtual machine (VM) instances to instantiate to implement the at least one VNF, using the at least one of the plurality of processors. In some of these examples, the clock frequency for each of the plurality of processors comprises a or the second clock frequency for each of the at least one of the plurality of processors; the orchestration system is configured to deploy, before the forecast traffic load is forecast to occur, at least one virtual machine (VM) for implementing the at least one VNF, using the at least one of the plurality of processors with respective first clock frequencies, and the adjustment of the clock frequency comprises, when the forecast traffic load is forecast to occur, adjusting the clock frequency for each respective processor of the at least one of the plurality of processors to the second clock frequency determined for the respective processor, wherein, for each of the at least one of the plurality of processors, the second clock frequency is higher than the first clock frequency.

In some examples, the computer system comprises a virtual infrastructure manager (VIM) to: receive a command from the orchestrator to perform the adjustment of the clock frequency for each respective processor; and send instructions to each of the plurality of computers, respectively, to instruct the adjustment of the clock frequency of the at least one processor of the respective computer.

In some examples, the orchestration system is configured to determine the clock frequency for each of the plurality of processors in further dependence on at least one of: a forecast energy usage of the plurality of processors or an environmental condition of an environment of the plurality of computers. The orchestration system may be configured to forecast energy usage of the plurality of processors in dependence on a forecast temperature of the environment of the plurality of computers, to obtain the forecast energy usage.

In some examples, the orchestration system is configured to: receive an indication of a lack of access of at least one of the plurality of computers to a mains power source; and in response to the indication, determine an updated clock frequency for at least one of the plurality of processors so as to increase a time over which each respective computer of the at least one of the plurality of computers is operational, using a power source comprised by the respective computer.

In some examples, the orchestration system is configured to: determine that a respective outcome of implementing at least one workload using the plurality of processors is independent of a clock frequency of the plurality of processors; in response, perform the determining the clock frequency for each of the plurality of processors and the instructing the adjustment of the clock frequency for each respective processor of the plurality of processors; and instruct the plurality of processors to implement the at least one workload.

In some examples, determining the clock frequency comprises determining the clock frequency in further dependence on a clock frequency adjustment policy, wherein optionally the clock frequency adjustment policy indicates a prioritisation level associated with: respective workloads to be implemented, respective tenants each associated with a respective workload to be implemented, and/or respective users each associated with a respective workload to be implemented.

In some examples, the orchestration system is configured to determine the clock frequency for each of the plurality of processors in further dependence on a forecast length of time for redistributing at least one existing workload of at least one of the plurality of processors, wherein optionally the orchestration system is configured to determine, in dependence on the forecast length of time for redistributing the at least one existing workload, that the clock frequency for the plurality of processors is to be adjusted instead of redistributing the at least one existing workload. In some examples, the orchestration system is remote from the plurality of computers. In some examples, the plurality of computers are distributed computers.

According to a second aspect of the present disclosure, there is provided a telecommunications network comprising the computer system according to any example in accordance with the first aspect of the present disclosure, wherein at least one of the plurality of computers is configured to host a virtual machine for implementing a virtual network function (VNF).

According to a third aspect of the present disclosure, there is provided an orchestration system configured to: obtain clock frequency dependency data associated with a workload, the clock frequency dependency data indicative that an outcome of implementing the workload is independent of a clock frequency of at least one processor of a computer system used to implement the workload; and in response to determining, in dependence on the clock frequency dependency data, that the outcome of implementing the workload is independent of the clock frequency of the at least one processor: determine an adjustment to the clock frequency of the at least one processor; and control the clock frequency of the at least one processor in dependence on the adjustment determined.

In some examples, the workload is a virtual network function (VNF), and the clock frequency dependency data represents at least one of: a description field in a template associated with the VNF or a descriptor associated with the VNF. In some examples, the orchestration system is configured to: forecast a traffic load of the plurality of processors to obtain a forecast traffic load; and determine the adjustment to the clock frequency of the at least one processor in dependence on the forecast traffic load.

Examples in accordance with the present disclosure may include any novel aspects described and/or illustrated herein. The disclosure also extends to methods and/or apparatus substantially as herein described and/or as illustrated with reference to the accompanying drawings. The approaches described herein may also be also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The disclosure also provides a method of transmitting a signal, and a computer product having an operating system that supports a computer program for performing any of the methods described herein and/or for embodying any of the apparatus features described herein. Any apparatus feature may also be provided as a corresponding step of a method, and vice versa. As used herein, means plus function features may alternatively be expressed in terms of their corresponding structure, for example as a suitably-programmed processor. Any feature in one aspect of the present disclosure may be applied, in any appropriate combination, to other aspects of the present disclosure. Any, some and/or all features in one aspect can be applied to any, some and/or all features in any other aspect, in any appropriate combination. Particular combinations of the various features described and defined in any aspects of the present disclosure can be implemented and/or supplied and/or used independently. As used throughout, the word 'or' can be interpreted in the exclusive and/or inclusive sense, unless otherwise specified.

BRIEF DESCRIPTION OF THE DRAWINGS

For a better understanding of the present disclosure, reference will now be made by way of example only to the accompany drawings, in which.

SPECIFIC DESCRIPTION

Apparatus and methods in accordance with the present disclosure are described herein with reference to particular examples. The invention is not, however, limited to such examples.

Figure 1:
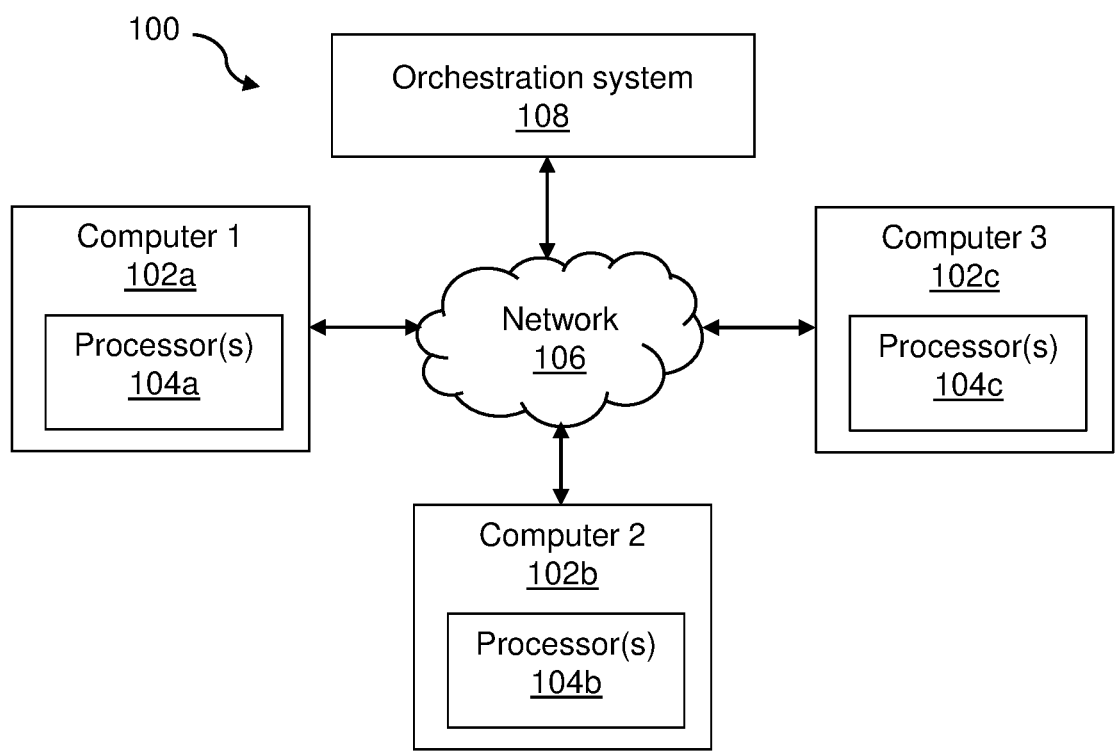
FIG. 1 is a schematic diagram showing a computer system according to examples.

FIG. 1 is a schematic diagram showing an example of a computer system 100. The computer system 100 includes a plurality of computers 102a-102c. A computer in a computer system such as that shown in FIG. 1 is for example any computing device that is capable of processing data according to received instructions, and may be a client device or a server (such as a network server). Each computer 102a-102c includes at least one processor 104a-104c, respectively. The computers 102a-102c are each connected to a network 106, which is for example a telecommunications network. The network 106 may be a single network or may comprise a plurality of networks. The network 106 may be or include a wide area network (WAN), a local area network (LAN) and/or the Internet, and may be a personal or enterprise network.

In this example, the computers 102a-102c are distributed computers, which are for example computers in different physical locations that can interact with each other to coordinate their actions. For example, physical or logical components of the computer system 100 may be shared between different computers 102a-102c. Nevertheless, the computers 102a-102c can for example operate together to perform a particular function. The computer system 100 of FIG. 1 may hence be considered a distributed computer system.

Distributed computers such as the computers 102a-102c of FIG. 1 can operate to implement a distributed workload, which is shared among a plurality of the computers 102a-102c or to implement a plurality of independent, non-distributed, workloads, which are implemented using a single one of the computers 102a-102c. In other words, respective computers of a distributed computer system, such as that of FIG. 1, can still operate independently in some cases.

An orchestration system 108 is also connected to the network 106. The orchestration system 108 functions as a centralised controller to control the state of the computer system 100, e.g. by sending commands to respective computers 102a-102c via the network 106. For example, the orchestration system 108 may be considered to act as a workflow engine that receives abstract instructions (as discussed further below with reference to FIGS. 2 to 5) and acts on the received instructions to modify the state of the computer system 100. The orchestration system 108 of FIG. 1 is remote from the computers 102a-102c. In other words, the orchestration system 108 is at a different physical location from the computers 102a-102c. This need not be the case in other examples, though.

The orchestration system 108 in FIG. 1 is configured to forecast a traffic load of the processors 104a-104c of the computer system 100 to obtain a forecast traffic load. The orchestration system 108 is configured to determine, in dependence on the forecast traffic load, a clock frequency for each of the processors 104a-104c so as to decrease a power consumption of the computer system 100. This for example increases the power efficiency of the computer system 100, e.g. by decreasing the power consumption of at least one of the processors 104a-104c for executing a specific workload. Decreasing the power consumption may involve increasing the amount of useful processing power output by the computer system 100 per input unit of electrical power, so that the amount of electrical power input to the computer system 100 may be decreased in order to perform the same task. It is to be appreciated that decreasing the power consumption of the computer system 100 may involve increasing the power consumption of individual one(s) of the processors 104a-104c, provided that the power consumption of the computer system 100 itself is decreased. For example, the orchestration system 108 may determine, in dependence on the forecast traffic load, that a clock frequency of a processor (such as a first processor 104a of FIG. 1) is to be increased so as to decrease the power consumption of the computer system 100 overall.

In the example of FIG. 1, the orchestration system 108 can proactively determine an appropriate clock frequency for the processors 104a-104c, for example so that the clock frequency can be adjusted (if necessary) before an increase in demand, e.g. corresponding to an increase in traffic load, as forecast by the orchestration system 108. The clock frequency can for example be adjusted before a change in the traffic load that exceeds a particular threshold indicative of a non-negligible or substantial change in the traffic load (e.g. corresponding to a change in the traffic load that meets or exceeds a particular percentage such as 5%, 10% or 20%). The clock frequency of a particular processor can be increased if the forecast indicates that the traffic load of that processor is likely to increase, so as to handle the increased demand without increasing latency. For example, the orchestration system 108 may determine that the clock frequency of a particular processor (e.g. the first processor 104a) is to be increased relative to a further processor (e.g. the second processor 104b) so that a rate of performance of a task by the processor is greater than a rate of performance of a further task by the further processor. In this way, the performance of certain tasks can be prioritised, which can reduce the power consumption of the computer system 100 overall. For example, using the output of the task as an input to the further task may allow certain processing to be omitted in the performance of the further task, which can reduce the power consumption compared to neglecting to prioritise the task and e.g. performing the task and the further task in parallel. Conversely, the clock frequency of a particular processor can be decreased if the forecast indicates that the traffic load of that processor is likely to decrease, to reduce power consumption of that processor. By determining the clock frequency of the processors in this way, the overall power consumption can be decreased, by targeting increases in clock frequency at those processors which are likely to be in higher demand than others. Basing the determination of clock frequency on the forecast traffic load allows adjustments in clock frequency to be made proactively, which can reduce latency and jitter. The performance of the computer system 100 may therefore be more predictable than if the clock frequency of a particular processor is adjusted based on the current load of the processor.

Using the orchestration system 108 to determine the clock frequencies for the processors can for example facilitate the straightforward determination of appropriate clock frequencies to decrease the power consumption of the computer system 100. As the orchestration system 108 is for example arranged to control the provisioning and allocation of services and/or workloads to respective computers 102a-102c (and, in some cases, to respective processors 104a-104c of the computers 102a-102c), the orchestration system 108 can determine clock frequencies to decrease the power consumption of computer system 100 while still maintaining performance of the computer system 100. For example, the orchestration system 108 may be or comprise a network orchestrator, which can be used to coordinate the provision of a service in a telecommunications network. In this way, existing components of a computer system (such as an existing orchestration system 108), can be exploited to additionally decrease the power consumption of the computer system by determining clock frequencies for the processors based on the forecast traffic load.

Determining the clock frequency of the processors 104a-104c in dependence on the forecast traffic load may further decrease the power consumption of the computer system 100 compared to other approaches. For example, the CPU loading of some network components, such as those that use the Data Plane Development Kit (DPDK), is always 100% even if the network load is low. In such cases, if the clock frequency of the CPU is determined based on the local CPU load, then the clock frequency will always be at a maximum even at times of low network load. This can increase the power consumption compared to the approaches herein, in which the clock frequency of the processors are determined in dependence on the forecast traffic load.

It is to be appreciated that the forecast traffic load may undergo processing before it is used by the orchestration system 108 to determine a clock frequency for the processors 104a-104c. In one example, the forecast traffic load is converted to a forecast processor load by using a predetermined relationship between traffic load and processor load for respective workloads to be performed by the processors 104a-104c.

After determining the clock frequency for each of the processors 104a-104c, an orchestrator of the orchestration system 108 is used to instruct an adjustment of the clock frequency for each of the processors 104a-104c to the clock frequency determined for the respective processor. The clock frequencies of at least one of the processors 104a-104c can for example be adjusted before a change in the traffic load of the at least one processor, which can for example reduce latency and/or missed packets that may otherwise occur if the clock frequency is increased after the traffic load has already increased, and reduce power consumption compared to decreasing the clock frequency after the traffic load has already decreased.

Figure 2:
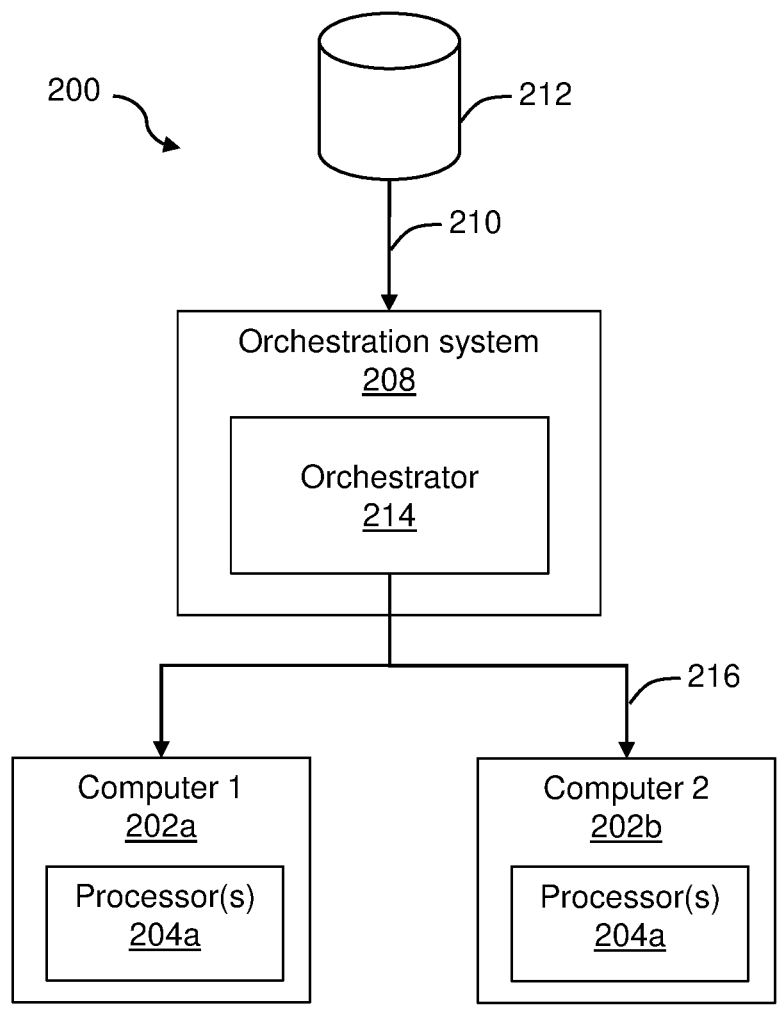
FIG. 2 is a schematic diagram showing a computer system according to further examples.

An example computer system 200 including an orchestration system 208 is shown in FIG. 2. The orchestration system 208 is arranged to receive data 210 for use in determining clock frequencies of respective processors 204a, 204b (collectively referred to with the reference numeral 204) of computers 202a, 202b (collectively referred to with the reference numeral 202) of the computer system 200. It is to be appreciated that each computer 202 may include one or more processors 204, and that the number of computers 202 shown as part of the computer system 200 of FIG. 2 is merely an example for illustration.

The data 210 may include traffic data, such as traffic telemetry representative of traffic sent to respective computers 202 of the computer system 200, which can be used by the orchestration system 208 to forecast the traffic load of the processors 204 of the computers 202. As the skilled person will appreciate, various algorithms may be used to forecast the traffic load, such as approaches using machine learning. For example, a Seasonal Autoregressive Integrated Moving Average (SARIMA) model may be used to forecast the traffic load. An example approach for forecasting the traffic load that uses a SARIMA model as a base is described in "*Application, Workload, and Infrastructure Models for Virtualized Content Delivery Networks Deployed in Edge Computing Environments*" by Thang Le Duc and Per-Olov Östberg, presented at the 2018 27$^{th}$ International Conference on Computer Communication and Networks (ICCCN). The data 210 may additionally or alternatively include resource data indicative of available resources of the computers 202, e.g. in the form of inventory information (discussed further below).

In the example of FIG. 2, the data 210 is received from a network server 212 which is arranged to store the data 210. For example, the data 210 may have been obtained by the network server 212 from the computers 202 or from a further computer, which may itself have received data from the computers 202. In other cases, though, the orchestration system 208 may receive at least part of the data corresponding to the data 210 of FIG. 2 from a different source than the network server 212, e.g. from the computers 202 or from a further computer. For example, the orchestration system 208 may receive traffic data from the network server 212 and resource data from the computers 202.

The orchestration system 208 of FIG. 2 also receives instructions, e.g. from the network server 212 or from a further computing device, such as user equipment (UE), to instruct the computers 202 to provide a particular service or to perform a particular function. The orchestration system 208 then determines a workflow to be performed in order to provide the instructed service. For example, an orchestrator 214 of the orchestration system 208 (discussed further below) may generate the workflow. For example, the orchestration system 208 can optimise the placement of workload(s) corresponding to the workflow on the computers 202, e.g. to optimise usage of resources of respective computers, since the computers may not each have the same resource availability or capability. A workflow for example refers to at least one task to be performed by the processors 204, and may indicate at least one workload that is to be implemented in order to perform the workflow. For example, the workflow may indicate a series of tasks to be performed (each corresponding to a respective workload), which may include tasks to be performed using processor(s) of different computers. The tasks may be independent, in which case they can be performed in parallel or sequentially depending on the resources available within the computer system 200. In some cases, though, at least some of the tasks may be interrelated. For example, the workflow may indicate that performance of a second task by a second processor 204b of a second computer 202b depends on a performance of at least part of a first task by a first processor 204a of a first computer 202a.

In examples such as that of FIG. 2, the orchestration system 208 can determine the clock frequency for the processors 204 in further dependence on the workflow. For example, the orchestration system 208 can determine clock frequencies in a manner that is cognisant of the workflow, so as to optimise the power efficiency of the computer system 200 for the workflow as a whole (e.g. where the workflow is a distributed workflow, which is distributed across a plurality of computers 202), rather than optimising the power efficiency on a per-computer basis. For example, the orchestration system 208 may determine that the clock frequency of the first processor 204a is to be increased (despite this increasing power consumption) if the performance of a second task by the second processor 204b depends on a performance of at least part of a first task by the first processor 204a. This approach can for example be used to prevent a reduction in clock frequency for a primary computer (such as the first computer 202a) that performs functionality that is the input for a secondary computer (or a plurality of secondary computers), so that the primary computer does not form a bottleneck in the workflow.

The orchestration system 208 may first determine an optimised workflow, and subsequently determine the clock frequency of the processors 204 in dependence on the forecast traffic load. In other cases, though, the orchestration system 208 may simultaneously optimise the workflow (e.g. the allocation of workloads of the workflow to respective computers 202) and the clock frequencies. This can further decrease the power consumption of the computer system 200. For example, with this approach, the orchestration system 208 may determine that using the computer system 200 to deploy a plurality of virtual machines (VM) at lower clock frequencies has a lower power consumption than deploying a centralised, larger VM.

It is to be appreciated that orchestration systems such as the orchestration system 208 of FIG. 2 may be flexible, and may determine the clock frequency of the processors 204 in dependence on the forecast traffic load and in further dependence on at least one characteristic of the service to be provided and/or computer system 200, e.g. represented by characteristic data, such as at least one of:

- a workflow to be performed by the processors 204 (as discussed above);
- a topology of the computer system 200, for example indicating the arrangement or other topological structure of the computer system 200 such as the resources of respective computers 202 (e.g. the processor(s) 204 accessible to a particular computer), and connections between respective elements of the computer system 200 such as the computers 202;
- inventory information;
- a forecast energy usage of the processors 204;
- an environmental condition;
- a forecast length of time for redistributing at least one existing workload of at least one of the processors 204; and
- a clock frequency adjustment policy.

For example, the orchestration system 208 of FIG. 2 may store topology data indicative of the topology of the computer system 200. The topology data may serve dual purpose in examples herein. The topology data may be used be the orchestration system 208 to determine how to distribute workloads between the computers 202 of the computer system 200, and may also be used, in conjunction with the forecast traffic load (and in some cases with at least one of the other characteristics of the service to be provided and/or computer system 200 discussed above) to determine the clock frequency for the processors 204. In other words, data used to support the existing functionality of the orchestration system 208 in orchestrating the provision of services using the computer system 200 can be used to additionally decrease the power consumption of the computer system 200. Use of the topology data can further reduce latency, and improve performance and/or reliability of the computer system 200.

The orchestration system 208 may additionally or alternatively store inventory information, such as the inventory of available computers 202 (e.g. available servers) within the computer system 200, the range of clock frequencies that processor(s) 204 of respective computers 202 can provide, the inventory of workloads and/or applications (as discussed further above), the inventory of processor loading of respective cores of the processors 204 (such as the percentage CPU loading of respective CPU cores), and/or the current clock frequencies of respective processors 204. Using this inventory information, for example in conjunction with the forecast traffic load (and in some cases using at least one of the other characteristics of the service to be provided and/or computer system 200), the orchestration system 208 can appropriately allocate workloads to respective processors. The orchestration system 208 can also determine appropriate clock frequencies for the processors 204 that for example take into account the cost of redistributing workloads among the processors 204, which may reduce or interrupt the service provided (as discussed further below).

In examples in which the orchestration system 208 determines the clock frequencies in further dependence on the forecast energy usage of the processors 204, the orchestration system 208 may forecast the energy usage of the processors 204 in any suitable manner, e.g. based on forecast actions, traffic or environmental conditions that may affect how much energy the processors 204 are likely to consume. In one example, the orchestration system 208 is configured to forecast energy usage of the processors 204 in dependence on a forecast temperature of an environment of the computers 202, to obtain the forecast energy usage. In this example, the clock frequencies can be determined based on a weather forecast, e.g. to reduce the clock frequencies before the occurrence of high temperatures. By determining the clock frequencies based on the forecast temperature, the clock frequencies can be adjusted appropriately before changes in temperature occur that may otherwise affect performance of the computer system 200. For example, a CPU of a computer 202 may have thermal protection that activates to lower the clock frequency of the CPU once the temperature has exceeded a particular limit, to protect the computer from overheating. This can extend the lifetime of the CPU as well as other components of the computer, such as air-conditioning components. However, by pre-emptively adjusting the clock frequency of the processors 204 in dependence on the forecast temperature, damage to the processors 204 can be reduced, which can further increase the lifetime of the processors 204. Moreover, a managed change in performance of the processors 204, e.g. as controlled by the orchestration system 208, may reduce negative impacts to a service provided by the processors 204 compared to a sudden, unplanned, reactive change in clock frequency (e.g. due to overheating).

It is to be appreciated that an environmental condition may be used to forecast energy usage of the processors 204 or may be used alone (or in combination with other characteristic(s) of the service to be provided and/or computer system 200) to further determine the clock frequencies of the processors 204. An environmental condition is for example a factor that affects the environment in which at least one of the processors 204 is located, which may affect the performance of the at least one processor either directly or indirectly. Environmental conditions that may be used by the orchestration system 208 include at least one of: a current or forecast temperature of the environment of at least one of the computers 202 (discussed above), a current or forecast temperature of at least one of the computers 202, a current or forecast load of air conditioning to provide cooling to at least one of the processors 204 (either internally, within the respective computer 202, or externally, within a room or building housing the computer 202) and/or a current or forecast electrical load of a premises for housing at least one of the computers 202. For example, if the air conditioning associated with a particular processor is nearing a maximum load, the orchestration system 208 may determine that the clock frequency for that processor is to be reduced and/or that a workload of that processor is to be moved to a different processor. Similarly, if the electrical load for the premises housing a particular computer is nearing a maximum load, the orchestration system 208 may determine that the clock frequency for processor(s) of the particular computer are to be reduced and/or that a workload of the processor(s) is to be moved to a computer located in a different premises. Mitigating action such as this can be performed by the orchestration system 208 pro-actively, e.g. if the environmental condition comprises a forecast environmental condition.

In some examples, adjusting the clock frequency of the processors 204 can be performed more quickly, and in some cases with reduced disruption, than adjusting workloads to be performed by the processors 204 (e.g. relocating a workload from one processor to another, and rebooting the workload on the other processor). For example, it may reduce the impact on service to change the clock frequency of at least one of the processors 204 rather than to scale up or down, or add or remove workloads, such as VMs. To account for this, the orchestration system 208 may be arranged to determine the clock frequencies in further dependence on the forecast length of time for redistributing at least one existing workload of at least one of the processors 204. The clock frequencies determined may be those that decrease power consumption, without unduly affecting the service provided by the processors 204. In some cases, the orchestration system 208 is configured to determine, in dependence on the forecast length of time for redistributing at least one existing workload of at least one of the processors 204, that the clock frequency for the processors 204 is to be adjusted instead of redistributing the at least one existing workload. This can reduce or avoid interruptions to a service provided by the computer system 200. For example, the orchestration system 208 may determine that the clock frequency for a first processor 204a that is under-utilised is to be decreased, and that the clock frequency for a second processor 204b that is busy is to be increased, which can improve performance of the computer system 200 without rearranging the workloads performed by the first and second processors 204a-204b.

In examples in which the clock frequency of the processors 204 is determined in further dependence on a clock frequency adjustment policy, the orchestration system 208 may be considered to determine policy-driven processor clock frequencies. The clock frequency adjustment policy for example defines how resources of the computer system 200 are to be allocated among clients such as users, workloads or tenants (where a tenant for example refers to a group of users, e.g. associated with the same access privileges). The clock frequency adjustment policy can therefore indicate a prioritisation level associated with respective workloads to be implemented, respective tenants each associated with a respective workload to be implemented, and/or respective users each associated with a respective workload to be implemented. In this way, different workloads, tenants and/or users can be implemented with different respective clock frequencies, with the clock frequencies determined in dependence on at least the forecast traffic load and the clock frequency adjustment policy. As an example, a lower clock frequency may be used for a processor for running a workload associated with a user with a lower prioritisation level than another user. However, a prioritisation level may vary over time. A clock frequency of at least one of the processors 204 may change in response to a change in the prioritisation level associated with a workload, tenant and/or user. For example, if the prioritisation level of the user increases, the clock frequency of the processor for running the workload associated with the user may in turn be increased, by the orchestration system 208.

In some cases, the clock frequency adjustment policy may not be used to determine the clock frequency of the processors 204 if the processors 204 are below capacity. However, if the workload of the processors 204 meets or exceeds capacity, the orchestration system 208 may prioritise the clock frequencies allocated to respective workloads, tenants and/or users, based on the clock frequency adjustment policy. For example, a particularly important task (e.g. an output of which is used by various other tasks) may be prioritised, and may hence be performed using at least one processor with a higher clock frequency than other workloads.

In some cases, the orchestration system 208 can be used to control the clock frequency of the processors 208 to maintain operation of the computer system 200 during power outages. In one example, the orchestration system 208 is configured to receive an indication of a lack of access of at least one of the computers 202 to a mains power source. For example, the orchestration system 208 may determine that the mains power source is not providing power or useable power to at least one of the computers 202, e.g. due to a power cut. In response, the orchestration system 208 can determine an updated clock frequency for at least one of the processors 204 to increase a time over which each of the computers 202 is operational using a power source comprised by the respective computer (such as a battery or an uninterruptable power source accessible to the computer). For example, the updated clock frequency may be a lower frequency to reduce power consumption and extend the time the computer system 200 as a whole remains operational. This can also provide time for the orchestration system 208 to reallocate a workload of the computer system 200 to a different computer system that has access to power, such as mains power. It is to be appreciated that, as explained above, even if each of the computers 202 lacks access to mains power, the clock frequency of the processor(s) of each of the computers 202 need not be adjusted by the same amount. For example, the clock frequency of at least one of the processors may not be adjusted, e.g. if that processor is being used to run a high-priority workload, while reducing the clock frequency of at least one other processor to reduce the power consumption of the processors 204 taken together.

In FIG. 2, after the orchestration system 208 has determined the clock frequency for each respective processor 204, an orchestrator 214 of the orchestration system 208 sends instructions 216 to the processors 204, to instruct adjustment of the clock frequency for each respective processor 204 if it is determined that the clock frequency is to be adjusted. The orchestrator 214 in this example refers to the component of the orchestration system 208 that instructs the adjustment of the clock frequency. It is to be appreciated, though, that the orchestrator 214 may be integral with the orchestration system 208, and there may not be a separate physical component corresponding to the orchestrator 214. In other words, the orchestrator 214 of FIG. 2 may be a logical rather than physical component of the orchestration system 208.

Figure 3:
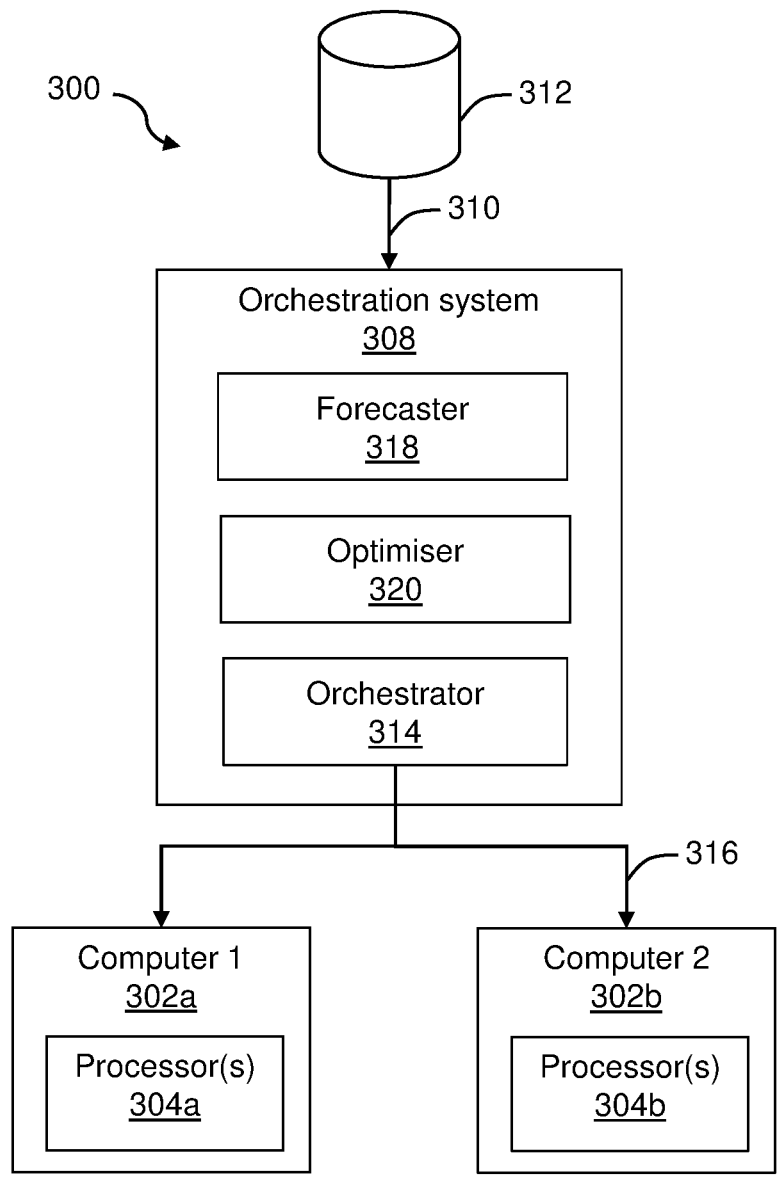
FIG. 3 is a schematic diagram showing a computer system according to yet further examples.

FIG. 3 is a schematic diagram showing a computer system 300 according to further examples. Features of FIG. 3 similar to corresponding features of FIG. 2 are labelled with the same reference numeral incremented by 100; corresponding descriptions are to be taken to apply.

The computer system 300 of FIG. 3 includes computers 302a-302b (collectively referred to with the reference numeral 302). Each of the computers 302 includes at least one processor 304a, 304b respectively. The processors are referred to collectively herein with the reference numeral 304. In the computer system 300 of FIG. 3, a network server 312 sends data 310 to an orchestration system 308 for use in forecasting a traffic load of the processors 304. The data 310 is processed by a forecaster 318 of the orchestration system 308 to obtain the forecast traffic load of the processors 304, e.g. in a similar manner as described with reference to FIG. 2. The forecast traffic load is provided to an optimiser 320 of the orchestration system 308, which determines a clock frequency for each of the processors 304 so as to decrease a power consumption of the computer system 300. The optimiser 320 may (although need not) determine the clock frequency of the processors 304 in further dependence on at least one characteristic of the service to be provided and/or computer system 200, as described further with reference to FIG. 2. The optimiser 320 then provides the determined clock frequencies to an orchestrator 314 of the orchestration system 308, which is used to send instructions 316 to the computers 302, to instruct adjustment of the clock frequency for each of the processors 304 to the clock frequency determined for the respective processor (if the clock frequency is to be adjusted for the respective processor).

In this example, the clock frequency for each of the processors 304 may be adjusted to the clock frequencies determined by the optimiser 320 without further adjustment of the clock frequencies. This may be the case, for example, where the clock frequency is determined solely using the forecast traffic load, or where the optimiser 320 is provided with or otherwise obtains sufficient data to determine the clock frequency in further dependence on at least one characteristic of the service to be provided and/or computer system 200. For example, the orchestrator 314 may determine a workflow to be implemented using the computer system 200 based on knowledge of the orchestrator 314 of the topology and/or resources of the computer system 200. The orchestrator 314 may then provide at least one of the workload or data indicative of the topology and/or of the resources of the computer system 200 to the optimiser 320 for use by the optimiser in determining the clock frequency of the processors 304. Similarly, the optimiser 320 may itself forecast the energy usage of the processors 304 and/or the length of time for redistributing at least one existing workload of at least one of the processors 304, or may receive such forecasts from a further component. The optimiser 320 may also obtain a clock frequency adjustment policy, from the orchestration system 308 or another component. The optimiser 320 can then make a placement recommendation, for placement of workloads to implement a particular workflow, as well as a recommendation of clock frequencies of respective processors 304 for implementing the workflow, e.g. based on capacity of the processors 304, topology, forecast energy usage (e.g. as represented by forecast temperature), forecast length of time for redistributing existing workload(s) and/or clock frequency adjustment policy. The recommendation determined by the optimiser 320 can then be sent to the orchestrator 314, which then executes the recommended placement, including instructing adjustment of the clock frequency of the processors, if needed. The recommended placement for example also includes the processor(s) to be used to implement respective workloads and the amount of processing capacity to be allocated to respective workloads.

In some cases, though, the optimiser 320 may not have the capability to consider factors relevant to the clock frequency other than the forecast traffic load. In such cases, the optimiser 320 may determine, in dependence on the forecast traffic load, a first clock frequency for a processor (e.g. a first processor 304a) so as to decrease the power consumption of the computer system 300. The orchestrator 314 may then determine a second clock frequency for the processor 304a in dependence on the first clock frequency and characteristic data indicative of a characteristic of a service to be provided and/or the computer system 300. The orchestrator 314 may then instruct the adjustment of the clock frequency of the processor 304a to the second clock frequency. In this way, the orchestrator 314 can over-ride a recommendation of the optimiser 320, e.g. due to constraints indicated by the characteristic data such as policy and/or environmental constraints. For example, the orchestrator 314 may determine not to place a particular workload on the first processor 304a or to use a lower clock frequency for the first processor 304a because a first computer 302a (which comprises the first processor 304a) is too hot. Although this may reduce the performance of the computer system 300, such a solution may nevertheless be desirable to reduce the risk of the first processor 304a being damaged or experiencing an unacceptable shortening of lifespan. In this context, the optimiser 320 may be considered to be a frequency determination component for determining a clock frequency for each respective processor 304 in dependence on the forecast traffic load (which need not be the maximum clock frequency possible, but which nevertheless improves the power efficiency of the computer system 300).

In the example of FIG. 3, the orchestrator 314 may additionally or alternatively determine adjustments to the clock frequency of at least one of the processors 304 without communicating with the optimiser 320. For example, the orchestrator 314 may independently determine that the clock frequency of the first processor 304a is to be reduced if the forecast temperature of the environment of the first processor 304a indicates that the first processor 304a is likely to overheat in future. As another example, the orchestrator 314 may independently determine that the clock frequency of the first processor 304a is to be increased in dependence on the forecast traffic load (e.g. as received by the orchestrator 314 from the forecaster 318) indicating that the traffic load is likely to increase in future. In such example, the orchestrator 314 may determine that the clock frequency of at least one of the processors 304 is to be adjusted without re-arranging existing workloads of the processors 304, to reduce latency.

An orchestration system similar to the orchestration systems 208, 308 of FIGS. 2 and 3 may be used to orchestrate the implementation of at least one virtual network function (VNF) using at least one of a plurality of processors of a computer system. Such an example orchestration system 408 is shown schematically in FIG. 4. Features of FIG. 4 similar to corresponding features of FIG. 2 are labelled with the same reference numeral incremented by 200; corresponding descriptions are to be taken to apply.

Figure 4:
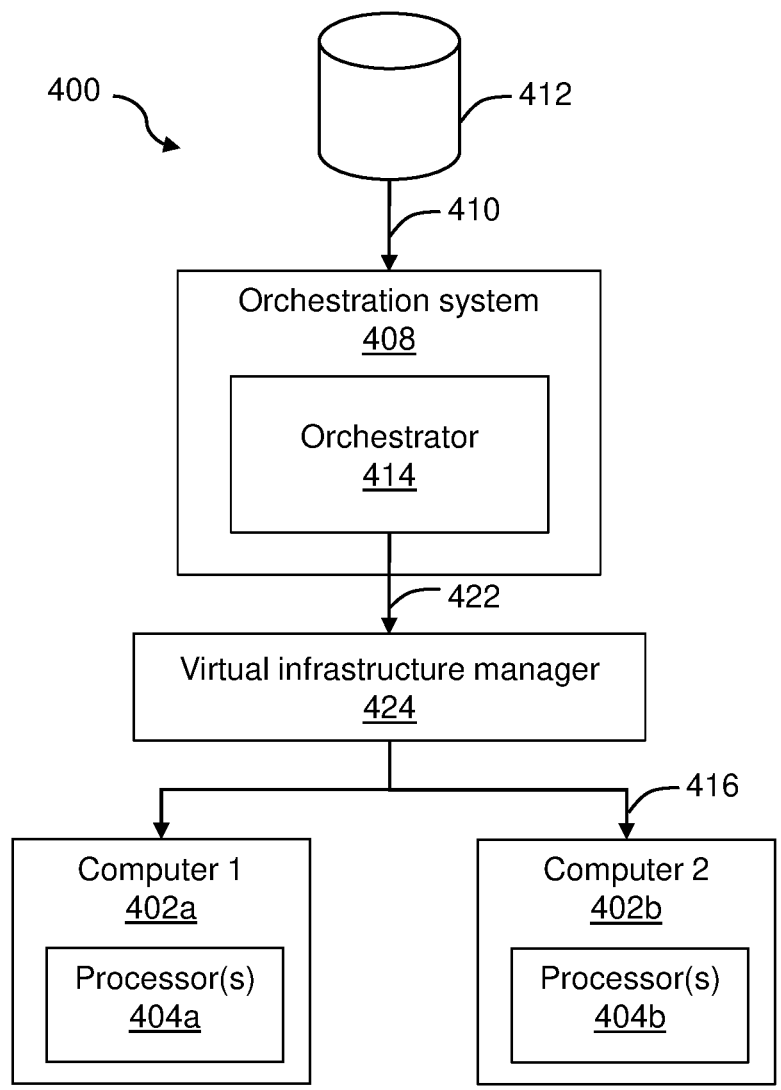
FIG. 4 is a schematic diagram showing a computer system according to still further examples.

The computer system 400 of FIG. 4 includes computers 402a-402b (collectively referred to with the reference numeral 402). Each of the computers 402 includes at least one processor 404a, 404b respectively. The processors are referred to collectively herein with the reference numeral 404. In the computer system 400 of FIG. 4, a network server 412 sends data 410 to an orchestration system 408 for use in forecasting a traffic load of the processors 404. The orchestration system 408 determines the forecast traffic load and determines the clock frequency of each of the processors 404 so as to decrease a power consumption of the computer system 400, e.g. in a similar manner as described with reference to FIG. 2 or FIG. 3.

In FIG. 4, the orchestration system 408 is configured to coordinate the virtualization of network functions. In this way, classes of network node functions can be virtualized and connected or otherwise chained together in order to provide a telecommunications service. To implement network function virtualization (NFV) and thereby implement at least one VNF, the orchestration system 408 in the example of FIG. 4 is configured to determine, in dependence on the forecast traffic load, a count of virtual machine (VM) instances to instantiate to implement the at least one VNF using the processors 404. Each VM instance may be considered to correspond to a workload, as discussed in the examples of FIGS. 2 and 3, and is hosted by at least one of the computers 402. In examples in which a plurality of VNFs are to be implemented, the orchestration system 408 may determine a first clock frequency for a first processor 404a to implement a first VNF and a second clock frequency (different from the first clock frequency) for a second processor 404b to implement a second VNF. For example, the first and second VNFs may have different prioritisation levels or the first and second processors 404a-404b may be subject to different environmental conditions, meaning that it may be appropriate to use a different clock frequency for implementing the first and second VNFs, respectively.

In the example of FIG. 4, an orchestrator 414 of the orchestration system 408 instructs adjustment of the clock frequencies of the processors 404 to the determined clock frequencies by sending a command 422 to a virtual infrastructure manager (VIM) 424. The VIM 424 is for example responsible for managing the virtualized infrastructure of an NFV-based service established using the computer system 400. The VIM 424 then sends instructions 416 to each of the computers 402 to instruct adjustment of the clock frequency of the at least one processor 404 of the respective computer 402 to the clock frequency determined for that computer by the orchestration system 408.

The orchestration system 408 of FIG. 4 may be used for initial instantiation of a VNF using a VM and/or for adjusting the clock frequency of at least one processor for implementing an existing VNF. If the orchestration system 408 is used for instantiation of a VNF, the orchestration system 408 for example determines the clock frequency to be used for at least one processor 404 for implementing the VNF, and then deploys or otherwise instantiates the VNF so that the at least one processor 404 operates with the determined clock frequency. If, however, the orchestration system 408 is used to adjust the clock frequency of at least one processor 404 hosting a VNF, the VNF may be instantiated using the at least one processor 404 with a first clock frequency, before subsequently adjusting the clock frequency of the at least one processor 404 to a second clock frequency (corresponding to the clock frequency determined by the orchestration system 408).

In some cases, workloads, such as VMs, may be deployed pre-emptively, but using at least one processor with a relatively slow clock frequency to reduce power consumption until demand for the workload arises, at which time the clock frequency of the at least one processor can be rapidly increased. For example, VMs typically take of the order of seconds to minutes to deploy, whereas the clock frequency of a processor can in some cases be changed in milliseconds. In one example, the orchestration system 408 is configured to deploy, before a forecast traffic load is forecast to occur, at least one VM for implementing at least one VNF, using at least one of the processors 404 with respective first clock frequencies. Then, when the forecast traffic load is forecast to occur, the clock frequency for each of the at least one processors 404 is increased to a second clock frequency respectively. Each of the second clock frequencies is higher than a corresponding first clock frequency for a given one of the processors 404, although the first clock frequency for each of the processors 404 need not be the same (and the second clock frequency for each of the processors 404 also need not be the same).

Some workloads, e.g. some VMs and/or VNFs, are sensitive to changes in a clock frequency of a processor used to implement the workload. For example, a workload may be sensitive to a change in clock frequency where the workload derives information from the clock frequency (e.g. to generate radio frequencies, synchronise real time clocks and/or measure performance or delay such as in a time-domain reflectometer, which can measure distance incorrectly if the clock frequency changes during a measurement). Although a real-time clock may be used in some cases to avoid reliance on a processor clock, this is computationally expensive so is undesirable to use for frequently-occurring events such as packet arrival. In such cases, it is preferable to use the processor clock. Hence, in some cases, it is desirable to provide a fixed clock frequency (which does not vary over time) for a particular workload, e.g. to avoid affecting the outcome of the workload and/or to provide a predictable latency.

Examples herein relate to identifying workloads (such as VMs and/or VNFs) that are sensitive to changes in a clock frequency of a processor, as will now be discussed with reference to FIG. 5, which is a flow diagram showing an example orchestration method 500. The orchestration method 500 of FIG. 5 may for example be implemented using an orchestration system such as the orchestration systems 208-408 of FIGS. 2 to 4.

Figure 5:
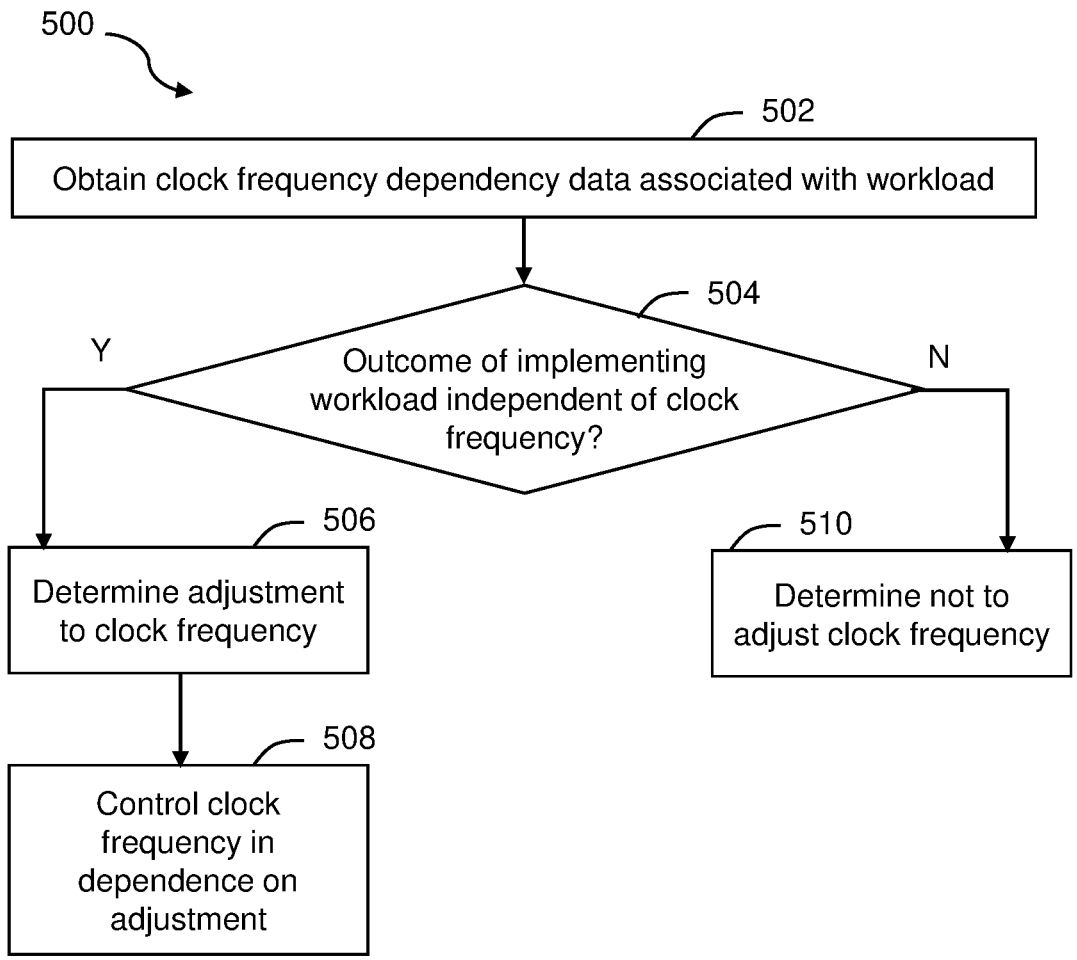
FIG. 5 is a flow diagram showing an orchestration method according to examples.

At item 502 of FIG. 5, clock frequency dependency data associated with a workload is obtained. The clock frequency dependency data indicates whether an outcome of implementing the workload is independent of a clock frequency of at least one processor of a computer system used to implement the workload. It is to be appreciated that, in general, the time taken to implement a workload will depend on the clock frequency of at least one processor used to implement the workload. However, this does not necessarily mean that the outcome of the workload depends on the clock frequency; the outcome of the workload depending on the workload for example implies that the result of implementing the workload (not just the time taken to perform the workload) is sensitive to changes in the clock frequency, and that the result may change if the clock frequency changes.

In one example in which the workload is a VNF, the clock frequency dependency data may represent at least one of a description field in a template associated with the VNF or a descriptor associated with the VNF. The template and/or the descriptor associated with a VNF can be read by an orchestration system prior to deployment of the VNF using a computer system. The orchestration system can then store the clock frequency dependency data, or another indication based on the clock frequency dependency data, such that, when the VNF is deployed, the orchestration system can deploy the VNF using at least one processor with an appropriate clock frequency (which may be time-varying or fixed depending on whether the clock frequency dependency data indicates that the outcome of the workload is independent of the clock frequency or not).

At item 504 of FIG. 5, it is determined, based on the clock frequency dependency data, whether the outcome of implementing the workload is independent of the clock frequency of the at least one processor.

If the outcome is independent, the method 500 of FIG. 5 involves, at item 506, determining an adjustment to the clock frequency of the at least one processor and, at item 508, controlling the clock frequency of the at least one processor in dependence on the adjustment determined. In some cases, a message is incorporated in an application programming interface (API) between the orchestration system and a workload, such as a VNF, to inform the workload of the current clock frequency as determined by the orchestration system. This message may be used by the VNF to adapt to changes in the clock frequency.

However, if at item 504 it is determined that the outcome of the workload is not independent of the clock frequency, the method 500 involves, at item 510, determining not to adjust the clock frequency of the at least one processor. For example, the orchestration system can then deploy the VNF using at least one processor with a fixed clock frequency.

The method 500 of FIG. 5 may for example be performed by an orchestration system such as the orchestration systems 208-408 of FIGS. 2 to 4 before a determination of the clock frequency and an adjustment of the clock frequency of the processors is performed. For example, the orchestration system may determine that a respective outcome of implementing at least one workload using a plurality of processors is independent of a clock frequency of the plurality of processors (e.g. as at item 504 of FIG. 5) and, in response, determine the clock frequency of the processors in dependence on at least the forecast traffic load of the processors as described in any the examples above. The processors may be then be used to implement the at least one workload, e.g. as instructed by the orchestration system.

Figure 6:
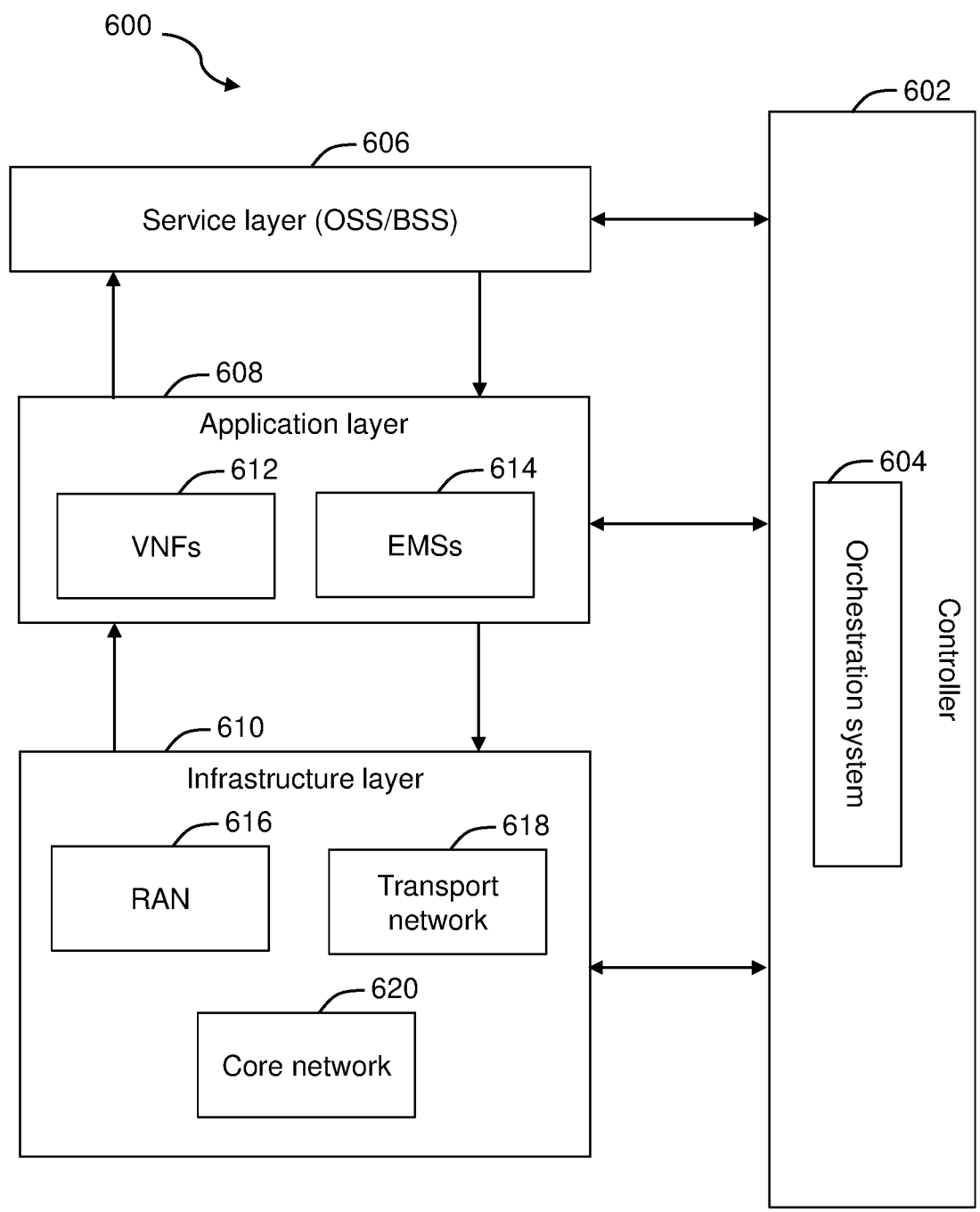
FIG. 6 is a schematic diagram showing a control framework for use with a telecommunications network according to examples.

FIG. 6 is a schematic diagram showing a control framework 600 for use with a telecommunications network, such as the network 106 of FIG. 1. The control framework 600 has been simplified for ease of illustration: it is to be appreciated that control frameworks such as that of FIG. 6 may include additional components not shown in FIG. 6. The control framework 600 includes a controller 602, which includes an orchestration system 604. The orchestration system 604 may be used to implement any of the methods described herein, and may for example be the same as the orchestration systems 208-408 of FIGS. 2 to 4. An example of internal components of an orchestration system is shown schematically in FIG. 7.

The control framework includes three layers: a service layer 606, an application layer 608 and an infrastructure layer 610. The service layer 606 interfaces with network entities that share an underlying physical network, such as an operational support system (OSS) or business support system (BSS) of a given telecommunications service provider. The service layer 606 is shown as separate from the orchestration system 604 in FIG. 6, but in other cases, the service layer 606 may form part of the orchestration system 604 itself. The service layer 606 manages service requirements and sends requests to the orchestration system 604, to manage a requested service.

The service layer 606 communicates with the application layer 608. The application layer 608 (which may be referred to as a network function layer) comprises a set of network functions to implement various predefined behaviours and interfaces. In FIG. 6, the application layer 608 includes VNFs 612 and element management systems (EMSs) 614. An EMS 614 is responsible for the functional management of a VNF.

The application layer 608 communicates with the infrastructure layer 610. The infrastructure layer 610 represents the underlying physical infrastructure, e.g. including a plurality of computers, each including at least one processor. The infrastructure layer 610 can be configured by the application layer 608 to allocate respective portions of the physical infrastructure to specific applications. In FIG. 6, the infrastructure layer 610 includes a RAN 616, a transport network 618 and a core network 620, but this is merely an example.

The controller 602 (including the orchestration system 604) interfaces with the service, application and infrastructure layers 606, 608, 610 to coherently manage the provision of a requested service, using the computers of the infrastructure layer 610. In this way, the controller 602 flexibly manages the underlying resources so as to provide the requested service.

Figure 7:
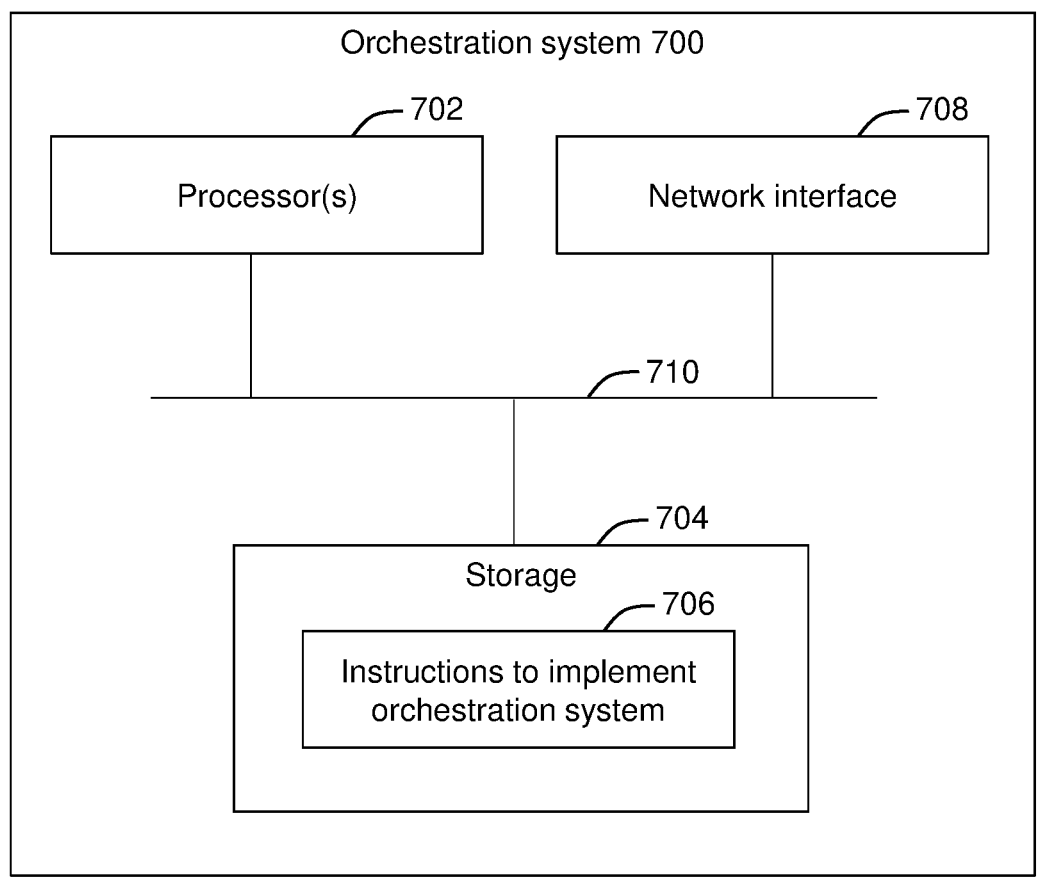
FIG. 7 is a schematic diagram showing internal components of an orchestration system according to examples.

FIG. 7 is a schematic diagram showing internal components of an orchestration system 700, which may be used in the implementation of the methods herein. It is to be appreciated that components of the orchestration system 700 may be comprised by a single device or may be distributed across a plurality of separate devices, e.g. to form a distributed system.

The orchestration system 700 includes at least one processor 702 (which may be or comprise processor circuitry). The at least one processor 702 is arranged to execute program instructions and process data. The at least one processor may include a plurality of processing units operably connected to one another, including but not limited to a central processing unit (CPU) and/or a graphics processing unit (GPU).

The orchestration system 700 also includes storage 704, which may be or include volatile or non-volatile memory, read-only memory (ROM), random access memory (RAM), or a non-transitory computer-readable medium. The storage 704 may be referred to as memory, which is to be understood to refer to a single memory or multiple memories operably connected to one another. The storage 704 of the orchestration system 700 may be storage of a single physical device or may instead be distributed across a physical network to improve resilience.

In FIG. 7, the storage 704 includes instructions 706 to implement the functionality of the orchestration system when processed by the at least one processor 702. Although not shown in FIG. 7, it is to be appreciated that the storage 704 is typically arranged to store further data than the instructions 706, such as the traffic data and/or characteristic data discussed herein, or other data to be processed by the orchestration system 700 to implement the functionality of the orchestration system. In other cases, though, at least a portion of such data may be stored by storage external to the orchestration system 700

The orchestration system 700 includes a network interface 708 for connecting the orchestration system 700 to a network, such as the network 106 of FIG. 1. The components of the orchestrator 700 are interconnected via a system bus 710.

Each of the computers discussed in examples herein, such as the computers 202-402 of FIGS. 2 to 4, may include similar internal components as those of the orchestration system 700 shown in FIG. 7. For example, it is to be appreciated that the processors 204-404 discussed herein may be or include at least one CPU, GPU and/or other processing unit.

ALTERNATIVES AND MODIFICATIONS

Each feature disclosed herein, and (where appropriate) as part of the claims and drawings may be provided independently or in any appropriate combination. Any reference numerals appearing in the claims are for illustration only and shall not limit the scope of the claims. In general, it is noted herein that while the above describes examples, there are several variations and modifications which may be made to the described examples without departing from the scope of the appended claims. One skilled in the art will recognise modifications to the described examples.

The invention claimed is:

1. A computer system comprising:
   a plurality of computers, each computer comprising at least one processor, respectively, such that the computer system comprises a plurality of processors; and
   an orchestration system comprising an orchestrator, the orchestration system configured to:
   forecast a traffic load of the plurality of processors to obtain a forecast traffic load;
   determine, in dependence on the forecast traffic load, a clock frequency for each of the plurality of processors so as to decrease a power consumption of the computer system;
   using the orchestrator, instruct adjustment of the clock frequency for each respective processor of the plurality of processors to the clock frequency determined for the respective processor;
   receive an indication of a lack of access of at least one of the plurality of computers to a mains power source; and
   in response to the indication, determine an updated clock frequency for at least one of the plurality of processors so as to increase a time over which each respective computer of the at least one of the plurality of computers is operational, using a power source comprised by the respective computer.

2. The computer system according to claim 1, wherein the orchestration system is configured to determine the clock frequency for each of the plurality of processors in further dependence on a workflow to be performed by the plurality of processors.

3. The computer system according to claim 2, wherein the workflow indicates that performance of a second task by a second processor of the plurality of processors depends on a performance of at least part of a first task by a first processor of the plurality of processors, wherein optionally the orchestration system is configured to determine to increase the clock frequency of the first processor in response to determining that the workflow indicates that the performance of the second task by the second processor depends on the performance of at least part of the first task by the first processor.

4. The computer system according to claim 2, wherein the orchestrator is configured to generate the workflow.

5. The computer system according to claim 1, wherein the orchestration system is configured to determine the clock frequency for each of the plurality of processors in further dependence on a topology of the computer system.

6. The computer system according to claim 1, wherein:
   the clock frequency for each of the plurality of processors comprises a second clock frequency for a processor of the plurality of processors;
   the orchestration system comprises a frequency determination component for determining, in dependence on the forecast traffic load, a first clock frequency for the processor so as to decrease the power consumption of the computer system; and
   the orchestrator is configured to:
   determine the second clock frequency for the processor, in dependence on the first clock frequency and characteristic data indicative of at least one of: a characteristic of a service to be provided or a characteristic of the computer system; and
   instruct the adjustment of the clock frequency for the processor to the second clock frequency.

7. The computer system according to claim 1, wherein the orchestration system is configured to determine, in dependence on the forecast traffic load, that a clock frequency of a processor of the plurality of processors is to be increased so as to decrease the power consumption of the computer system.

8. The computer system according to claim 7, wherein the orchestration system is configured to determine that the clock frequency of the processor is to be increased relative to a further processor of the plurality of processors such that a rate of performance of a task by the processor is greater than a rate of performance of a further task by the further processor.

9. The computer system according to claim 1, wherein the orchestration system is configured to orchestrate the implementation of at least one virtual network function (VNF) using at least one of the plurality of processors.

10. The computer system according to claim 9, wherein determining the clock frequency for each of the plurality of processors comprises determining a first clock frequency for a first processor of the plurality of processors to implement a first VNF of the at least one VNF and a second clock frequency, different from the first clock frequency, for a second processor of the plurality of processors to implement a second VNF of the at least one VNF.

11. The computer system according to claim 9, wherein the orchestration system is configured to determine, in dependence on the forecast traffic load, a count of virtual machine (VM) instances to instantiate to implement the at least one VNF, using the at least one of the plurality of processors.

12. The computer system according to claim 9, wherein:
   the clock frequency for each of the plurality of processors comprises a, or the, second clock frequency for each of the at least one of the plurality of processors;
   the orchestration system is configured to deploy, before the forecast traffic load is forecast to occur, at least one virtual machine (VM) for implementing the at least one VNF, using the at least one of the plurality of processors with respective first clock frequencies, and
   the adjustment of the clock frequency comprises, when the forecast traffic load is forecast to occur, adjusting the clock frequency for each respective processor of the at least one of the plurality of processors to the second clock frequency determined for the respective processor, wherein, for each of the at least one of the plurality of processors, the second clock frequency is higher than the first clock frequency.

13. The computer system according to claim 1, comprising a virtual infrastructure manager (VIM) to:
   receive a command from the orchestrator to perform the adjustment of the clock frequency for each respective processor; and
   send instructions to each of the plurality of computers, respectively, to instruct the adjustment of the clock frequency of the at least one processor of the respective computer.

14. The computer system according to claim 1, wherein the orchestration system is configured to determine the clock frequency for each of the plurality of processors in further dependence on at least one of: a forecast energy usage of the plurality of processors or an environmental condition of an environment of the plurality of computers.

15. The computer system according to claim 14, wherein the orchestration system is configured to forecast energy usage of the plurality of processors in dependence on a forecast temperature of the environment of the plurality of computers, to obtain the forecast energy usage.

16. The computer system according to claim 1, wherein the orchestration system is configured to:
- determine that a respective outcome of implementing at least one workload using the plurality of processors is independent of a clock frequency of the plurality of processors;
- in response, perform the determining the clock frequency for each of the plurality of processors and the instructing the adjustment of the clock frequency for each respective processor of the plurality of processors; and
- instruct the plurality of processors to implement the at least one workload.

17. The computer system according to claim 1, wherein the orchestration system is configured to determine the clock frequency for each of the plurality of processors in further dependence on a forecast length of time for redistributing at least one existing workload of at least one of the plurality of processors, wherein optionally the orchestration system is configured to determine, in dependence on the forecast length of time for redistributing the at least one existing workload, that the clock frequency for the plurality of processors is to be adjusted instead of redistributing the at least one existing workload.

18. The computer system according to claim 1, wherein the orchestration system is remote from the plurality of computers.

19. The computer system according to claim 1, wherein the plurality of computers are distributed computers.

20. A telecommunications network comprising the computer system according to claim 1, wherein at least one of the plurality of computers is configured to host a virtual machine for implementing a virtual network function (VNF).

21. A computer system comprising:
- a plurality of computers, each computer comprising at least one processor, respectively, such that the computer system comprises a plurality of processors; and
- an orchestration system comprising an orchestrator, the orchestration system configured to:
  - forecast a traffic load of the plurality of processors to obtain a forecast traffic load;
  - determine, in dependence on the forecast traffic load, a clock frequency for each of the plurality of processors so as to decrease a power consumption of the computer system; and
  - using the orchestrator, instruct adjustment of the clock frequency for each respective processor of the plurality of processors to the clock frequency determined for the respective processor;
- wherein determining the clock frequency comprises determining the clock frequency in further dependence on a clock frequency adjustment policy, wherein optionally the clock frequency adjustment policy indicates a prioritisation level associated with: respective workloads to be implemented, respective tenants each associated with a respective workload to be implemented, and/or respective users each associated with a respective workload to be implemented.

* * * * *